June 5, 1928.  R. T. SMITH  1,672,696
WHEEL FOR RESILIENT TIRES
Filed Aug. 21, 1923   3 Sheets-Sheet 2
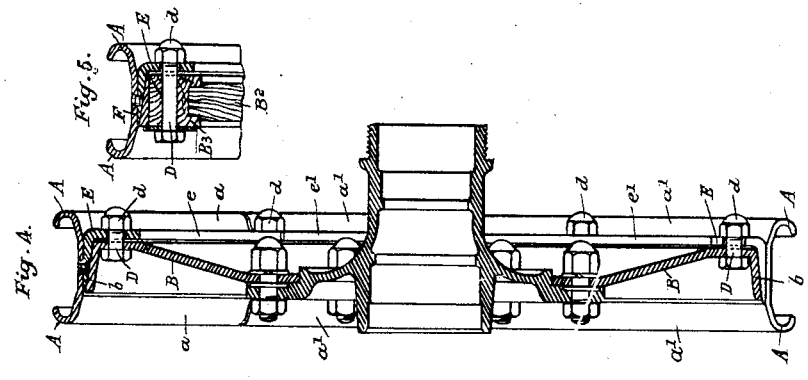
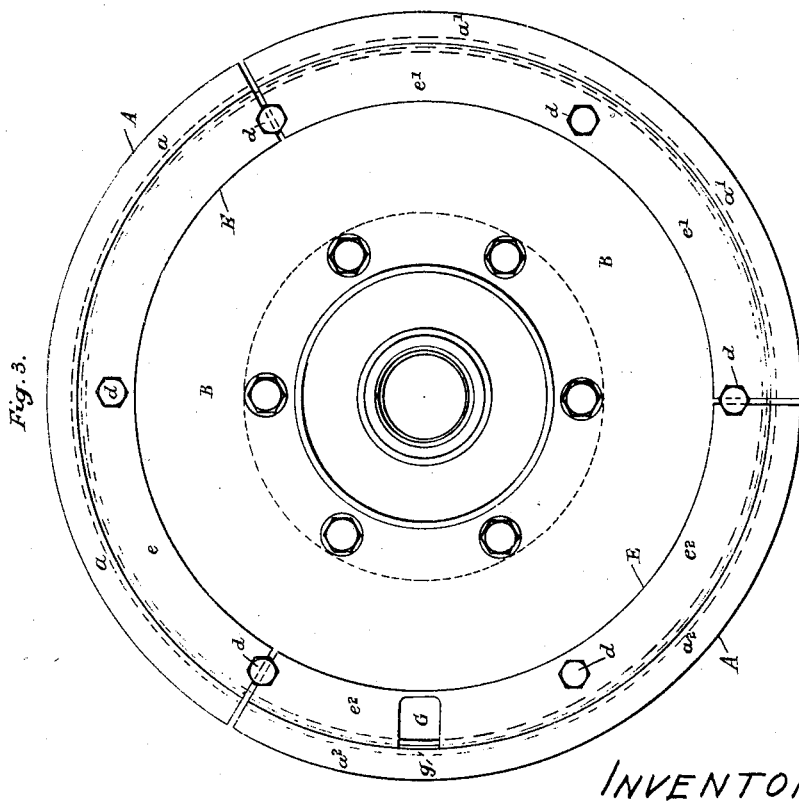
INVENTOR:-
ROBERT THOMAS SMITH
by his Attorneys
Howson and Howson June 5, 1928.  1,672,696
R. T. SMITH
WHEEL FOR RESILIENT TIRES
Filed Aug. 21, 1923  3 Sheets-Sheet 3
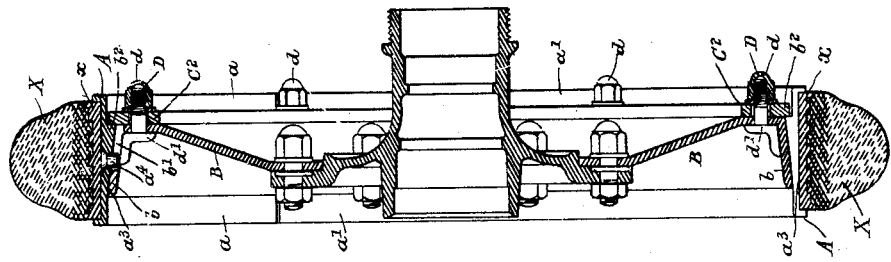
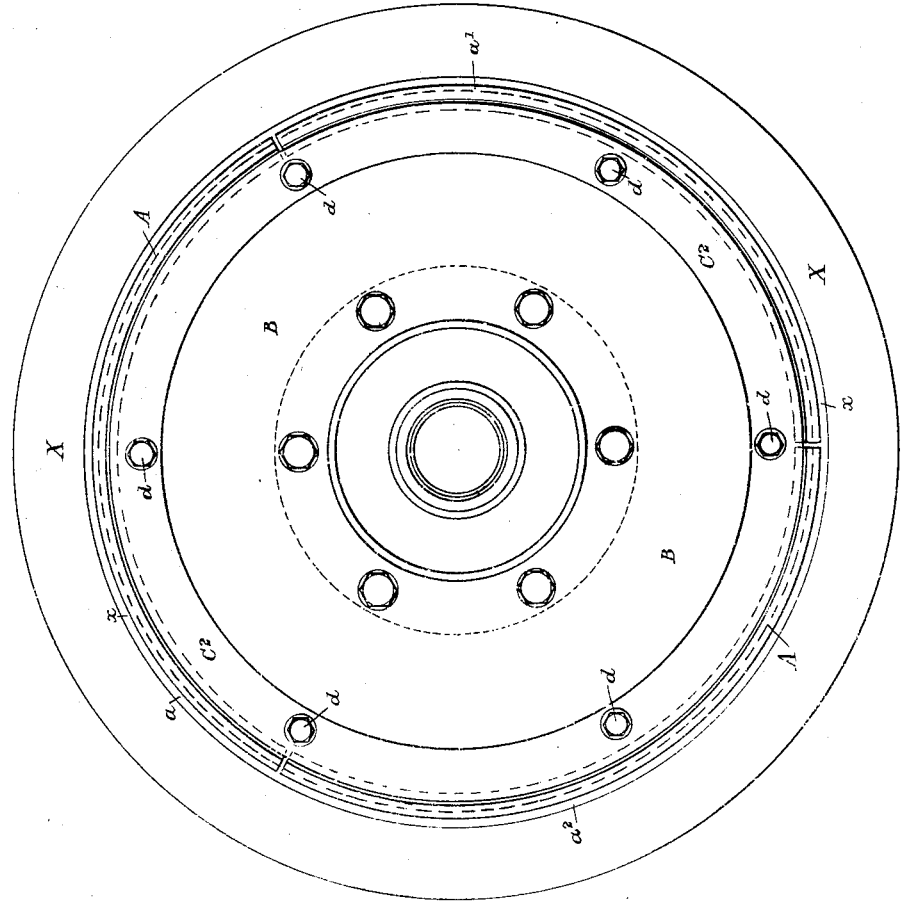
INVENTOR:-
ROBERT THOMAS SMITH
by his Attorneys
Howson and Howson Patented June 5, 1928.

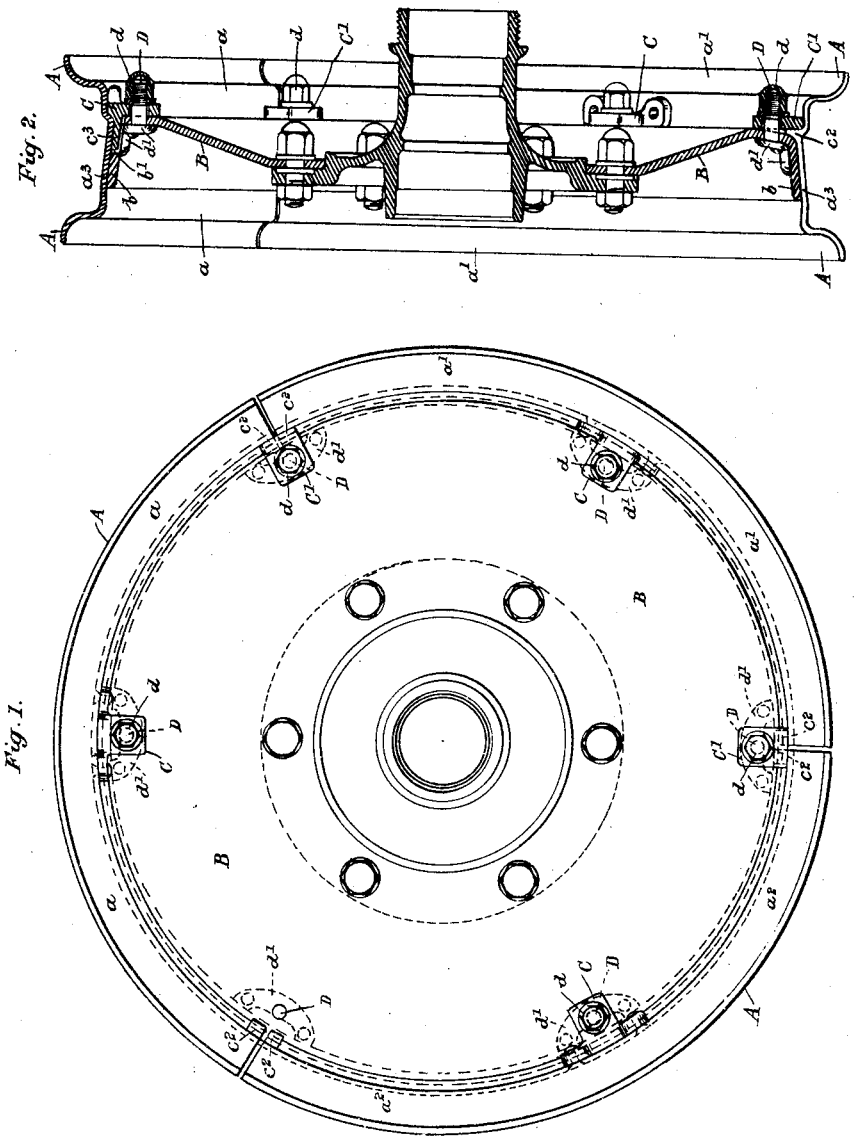

1,672,696

UNITED STATES PATENT OFFICE.

ROBERT THOMAS SMITH, OF WARRINGTON, ENGLAND, ASSIGNOR TO LYNTON WHEEL AND TYRE COMPANY, LIMITED, OF WARRINGTON, ENGLAND, A BRITISH COMPANY.

WHEEL FOR RESILIENT TIRES.

Application filed August 21, 1923, Serial No. 658,536, and in Great Britain October 6, 1922.

My invention relates to wheels for resilient tires for road vehicles, the said wheels being of the kind in which the tires are mounted on flanged rims which are detachable from the body-part of the wheel and it has for its principal object to provide a wheel of the aforesaid kind with an improved flanged rim whereby the removal and replacement of the rim from the tire when off the said body-part of the wheel can be more easily and quickly effected.

According to my invention the flanged rim is divided radially into segments of a circle, which may for example be three in number, each free and independent of the others so that each segment can by movement in a radial direction, be successively placed in position on, or removed from, the inner circumference of the tire. It will be understood that the adjacent ends of the segments are not connected with each other and are spaced apart when the tire and rim are held in position on the body part of the wheel. A suitably inclined surface is provided on the inner circumference of each of the said rim segments and also on the outer circumference of the body-part of the wheel, so that, after the said rim segments have been placed in position on the tire, the act of forcing the said rim up the inclined surface on the body-part will cause the said segments to be forced radially outward, thereby in effect increasing their combined circumferential length, and will be firmly wedged between the tire and the body-part so that the said tire and rim are thereby securely held in position on the said wheel.

Any suitable means may be provided for forcing the flanged rim with the tire in position thereon on to the body-part of the wheel, for example, a ring may be provided to bear upon shoulders, or annular abutments, formed on the inner part of the segments, constituting the said rim, through which ring and the body-part of the wheel pass screw-bolts, so that by screwing up the nuts on the bolts the said rim with the tire thereon is caused to be forced on to the outer circumference of the body-part of the wheel; or instead of the ring brackets or segments may be formed on, or secured to, the rim.

If desired inter-engaging projections and recesses on the rim of the tire and on the body-part of the wheel may be provided to prevent creeping.

In wheels to which pneumatic tires are to be applied a suitably shaped recess should be provided in the body-part of the wheel for the reception of the valve.

I will describe with reference to the accompanying drawings examples of how my invention may be performed.

Figures 1 and 2 show in side elevation and transverse section, respectively, a flanged rim suitable for receiving a cushion tire and removably secured to a wheel of the disc type. Figures 3 and 4 are similar views showing a flanged rim suitable for receiving a pneumatic tire and also removably secured to a wheel of the disc type, Figure 5 showing in section sufficient of a wheel to illustrate the application of such a rim to a wheel having wooden-spokes, Figures 6 and 7 are respectively a side elevation and a transverse section of a wheel having a flanged rim adapted to receive a solid tire moulded onto a metal seating.

Referring first to Figures 1 and 2 the flanged rim A to receive the tire is in a number of segments (three, for example, as shown) $a$, $a^1$ and $a^2$, which can be separately placed by movement in a radial direction in position on, or removed from, the inner circumference of the tire. It will be noted that the segments of the rim are of such a length that their contiguous ends are in alignment when in position on the body part before expansion. The inner surfaces of the said segments of the divided rim A are inclined at $a^3$ and the outer circumference of the body-part B of the wheel has a correspondingly inclined surface $b$ so that when the said segments are caused to move up the said inclined surface $b$ they are forced radially outward in opposition to the resistance of the tire. The means shown in Figures 1 and 2 for thus forcing the rim A onto the body-part B of the wheel comprises a lug C riveted, or otherwise secured, to each of the segments, $a$, $a^1$ and $a^2$, at or towards, the centre of their length, and pieces $C^1$ which bear upon lugs $c^2$ formed at the ends of each of the said segments. In Figure 1 one of the pieces $C^1$ is presumed to have been removed to show clearly the lugs $c^2$. Screw-bolts D are passed through holes in the body-part B of the wheel and the lugs C and the pieces C¹ respectively so that by screwing up the nuts $d$ upon the said bolts the segments are forced up the inclined surface $b$ of the outer circumference of the body-part B of the wheel. In order to prevent creeping, each of the lugs C is provided with an inwardly projecting piece C³ (see the top of Figure 2) which slidably fits in a slot $b^1$ in the inclined periphery $b$ of the body-part B of the wheel. The heads $d^1$ of the screw-bolts D are shown as being L-shaped so as to snugly fit into the angle at the juncture of the periphery and side of the body-part B of the wheel, the said heads $d^1$ being preferably riveted to the body-part as shown.

In the modified arrangement shown in Figures 3 and 4 each of the segments $a$, $a^1$, $a^2$, has riveted to its inner circumference a flanged segmental part marked $e$, $e^1$, $e^2$, respectively the inner periphery of these being inclined to correspond with the inclined outer periphery $b$ of the body-part B of the wheel and the combined segments constituting together the flanged rim marked A and E. In this example screw-bolts D are passed through the body-part B of the wheel and each of the flanges $e$, $e^1$, $e^2$, so that by screwing up the nuts $d$ upon the bolts D the segments are forced up the inclined surface $b$ of the outer circumference of the body-part B of the wheel as in the first described arrangement. G, (Figure 3) represents a hole in the periphery and body-part B of the wheel and $g$ represents a hole in the rim A, E, through which holes the valve of the pneumatic tire can be passed.

Figure 5 illustrates how the radially divided flanged rim A, E, shown in Figures 3 and 4, can be applied to a wheel with wooden-spokes. In this example B² represents the outer end of one of the spokes and B³ represents the wooden periphery of the wheel which has secured to it a metal ring, or band, F, its outer periphery inclined to correspond with the inclined inner surfaces of the segments $e$, $e^1$, $e^2$, constituting the part E of the rim of the tire. In other respects the wheel and rim may be the same as in Figures 3 and 4, the screwing up of the nuts $d$, on the bolts D, forcing the rim of the tire tightly onto the inclined ring F of the body part of the wheel.

In Figures 6 and 7 I have shown my invention applied to a flanged rim A adapted to receive a solid tire X with a hard rubber base moulded into a metal seating ring $x$. In this arrangement the flanged rim A is also radially divided into three segments $a$, $a^1$ and $a^2$ having inclined inner surfaces $a^3$ which engage with a correspondingly inclined surface $b$ on the outer circumference of the body-part B of the wheel but each of the said segments, has a shoulder $b^2$ formed thereon which, when the said segments are in place, constitute abutments for a ring C² by means of which and the screw bolts D and nuts $d$ the segmental rim A and tire are forced onto the body-part B of the wheel. To prevent creeping one, or more, of the segments of the rim A may be provided with an inwardly projecting stud $a^4$, or its equivalent, engaging a slot, or slots, such as $b^1$ in the inclined periphery $b$ of the body-part B of the wheel.

Although in each of the examples I have presumed the flanged rim to be radially divided into three segments it is to be understood that it may be divided into any other suitable number of segments.

It is to be understood that where a resilient tire is mentioned, pneumatic, cushion and solid rubber tires are all included.

What I claim is:—

1. A wheel for resilient tires having a body part, in combination with a removable rim divided radially into a plurality of segments whose adjacent ends are unconnected, the rim segments being adapted to wedge outwardly against the resistance of the tire when forced on to the periphery of the body part, and the adjacent ends of the segments being spaced apart when the rim is wedged against the resistance of the tire.

2. A wheel for resilient tires having a body part with its periphery inclined, in combination with a removable flanged rim divided radially into a plurality of segments having corresponding inclines on the inner surface, the adjacent ends of the segments being unconnected and spaced apart when the rim is wedged against the resistance of the tire, and an abutment on each segment of said rim and screw bolts passing through said abutments and body of the wheel adapted to force said segments up the inclined periphery of the body part, substantially as described.

In testimony whereof I have signed my name to this specification.

ROBERT THOMAS SMITH.